US011693415B2

(12) United States Patent
Refaat et al.

(10) Patent No.: US 11,693,415 B2
(45) Date of Patent: Jul. 4, 2023

(54) PREDICTING CUT-IN PROBABILITIES OF SURROUNDING AGENTS

(71) Applicant: Waymo LLC, Mountain View, CA (US)

(72) Inventors: Khaled Refaat, Mountain View, CA (US); Chi Pang Lam, San Mateo, CA (US)

(73) Assignee: Waymo LLC, Mountain View, CA (US)

( * ) Notice: Subject to any disclaimer, the term of this patent is extended or adjusted under 35 U.S.C. 154(b) by 444 days.

(21) Appl. No.: 16/676,379

(22) Filed: Nov. 6, 2019

(65) Prior Publication Data

US 2021/0132619 A1 May 6, 2021

(51) Int. Cl.
G01C 22/00 (2006.01)
G05D 1/00 (2006.01)
(Continued)

(52) U.S. Cl.
CPC .......... G05D 1/0221 (2013.01); G01C 21/34 (2013.01); G05D 1/0088 (2013.01); G06N 3/006 (2013.01);
(Continued)

(58) Field of Classification Search
CPC ............... G05D 1/0221; G05D 1/0088; G05D 2201/0213; G01C 21/34; G06N 3/006;
(Continued)

(56) References Cited

U.S. PATENT DOCUMENTS 7,444,241 B2 10/2008 Grimm
8,457,827 B1 6/2013 Ferguson et al.
(Continued)

FOREIGN PATENT DOCUMENTS

KR 101874186 7/2018

OTHER PUBLICATIONS

Kim et al., "Probabilistic Vehicle Trajectory Prediction over Occupancy Grid Map via Recurrent Neural Network," 2017 IEEE 20th International Conference on Intelligent Transportation Systems, Oct. 2017, 6 pages.
(Continued)

Primary Examiner — Harry Y Oh
Assistant Examiner — Sohana Tanju Khayer
(74) Attorney, Agent, or Firm — Fish & Richardson P.C.

(57) ABSTRACT

Methods, systems, and apparatus, including computer programs encoded on computer storage media, for generating cut-in probabilities of agents surrounding a vehicle. One of the methods includes obtaining agent trajectory data for one or more agents in an environment; obtaining vehicle trajectory data of a vehicle in the environment; and processing a network input generated from the agent trajectory data and vehicle trajectory data using a neural network to generate a cut-in output, wherein the cut-in output comprises respective cut-in probabilities for each of a plurality of locations in the environment, wherein the respective cut-in probability for each location that is a current location of one of the one or more agents characterizes a likelihood that the agent in the current location will intersect with a planned future location of the vehicle within a predetermined amount of time.

19 Claims, 10 Drawing Sheets

(51) Int. Cl.
    *G05D 1/02*         (2020.01)
    *G06N 3/04*         (2023.01)
    *G01C 21/34*       (2006.01)
    *G06N 3/08*         (2023.01)
    *G06N 3/006*       (2023.01)
    *G06N 20/20*      (2019.01)
    *G08G 1/16*         (2006.01)
    *G06N 3/045*       (2023.01)
    *G06N 5/01*         (2023.01)

(52) U.S. Cl.
    CPC ............... *G06N 3/04* (2013.01); *G06N 3/045* (2023.01); *G06N 3/08* (2013.01); *G06N 5/01* (2023.01); *G06N 20/20* (2019.01); *G08G 1/167* (2013.01); *G05D 2201/0213* (2013.01)

(58) Field of Classification Search
    CPC .......... G06N 3/04; G06N 3/0454; G06N 3/08; G06N 5/003; G06N 20/20; G08G 1/167
    See application file for complete search history.

(56) References Cited

U.S. PATENT DOCUMENTS

| | | | | |
|---|---|---|---|---|
| 11,079,764 | B2* | 8/2021 | Nister | G05D 1/0223 |
| 11,195,418 | B1* | 12/2021 | Hong | G05D 1/0212 |
| 2013/0054106 | A1 | 2/2013 | Schmudderich et al. | |
| 2017/0120902 | A1* | 5/2017 | Kentley | B60R 19/42 |
| 2017/0270799 | A1* | 9/2017 | Takeda | B60W 30/00 |
| 2018/0141544 | A1* | 5/2018 | Xiao | G08G 1/164 |
| 2019/0176818 | A1* | 6/2019 | Movert | B60W 30/09 |
| 2019/0384294 | A1* | 12/2019 | Shashua | G06F 16/29 |
| 2020/0010077 | A1* | 1/2020 | Cormack | B60W 40/08 |
| 2020/0150672 | A1* | 5/2020 | Naghshvar | G05D 1/0221 |
| 2020/0172100 | A1* | 6/2020 | Kato | G08G 1/16 |
| 2020/0174481 | A1* | 6/2020 | Van Heukelom | G05D 1/0088 |
| 2020/0364508 | A1* | 11/2020 | Gurel | G05D 1/0246 |

OTHER PUBLICATIONS

PCT International Search Report and Written Opinion in International Appln. No. PCT/US2020/058712, dated Feb. 3, 2021, 10 pages.

Refaat et al., "Agent Prioritization for Autonomous Navigation," CoRR, Sep. 2019, arxiv.org/abs/1909.08792, 8 pages.

Djuric et al. "Short-term Motion Prediction of Traffic Actors for Autonomous Driving using Deep Convolutional Networks," arXiv 1808.058192v2, Sep. 16, 2018, 7 pages.

Lee et al. "Convolution Neural Network-based Lane Change Intention Prediction of Surrounding Vehicles for ACC," IEEE International Conference on Intelligent Transportation, Oct. 16, 2017, 6 pages.

Strickland et al. "Deep Predictive Models for Collision Risk Assessment in Autonomous Driving," arXiv 1711.10453v2, Mar. 29, 2018, 8 pages.

International Preliminary Report on Patentability in International Appln. No. PCT/US2020/058712, dated May 19, 2022, 7 pages.

* cited by examiner

PREDICTING CUT-IN PROBABILITIES OF SURROUNDING AGENTS

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes how a vehicle, e.g., an autonomous or semi-autonomous vehicle, can generate a prediction of whether one or more surrounding agents are going to cut in front of the vehicle. The cut-in prediction is generated by a machine learning model referred to in this specification as a "cut-in neural network." That is, given an input that characterizes the environment surrounding the vehicle, the output of the cut-in neural network is one or more probabilities that represent a likelihood that one or more surrounding agents will "cut-in," i.e., enter the planned path of the vehicle within a certain amount of time, e.g., 3 seconds or 5 seconds. This specification also describes how a computer system can train the cut-in neural network using training examples generated by vehicle operating in the real world.

Once the cut-in neural network has been trained, the trained cut-in neural network can be deployed on a vehicle and can be used by the vehicle to make autonomous or semi-autonomous driving decisions.

According to a first embodiment there is provided a method comprising obtaining agent trajectory data for one or more agents in an environment, the agent trajectory data for each agent comprising a current location and current values for a predetermined set of motion parameters of the agent and a previous location and previous values for the predetermined set of motion parameters of the agent for each of one or more previous time points; obtaining vehicle trajectory data of a vehicle in the environment, the vehicle trajectory comprising a current location and current values for the predetermined set of motion parameters of the vehicle, a previous location and previous values for the predetermined set of motion parameters of the vehicle for each of one or more previous time points, and a planned future location and planned future values for the predetermined set of motion parameters of the vehicle for each of one or more future time points; and processing a network input generated from the agent trajectory data and vehicle trajectory data using a neural network to generate a cut-in output, wherein the cut-in output comprises respective cut-in probabilities for each of a plurality of locations in the environment, wherein the respective cut-in probability for each location that is a current location of one of the one or more agents characterizes a likelihood that the agent in the current location will intersect with a planned future location of the vehicle within a predetermined amount of time.

In some implementations, the agent trajectory data further comprises a predicted future location and predicted future values for the predetermined set of motion parameters of the agent for each of one or more future time points.

In some implementations, the vehicle trajectory data further comprises, for each of the one or more future time points, a plurality of planned future locations and a plurality of planned future values for each of the predetermined set of motion parameters of the vehicle.

In some implementations, the plurality of locations includes non-agent locations that are not any of the current locations of the one or more agents, and wherein the neural network has been trained to generate null probabilities for the non-agent locations.

In some implementations, the network input comprises at least one of: an image characterizing road lanes in the environment, or an image characterizing bounding boxes of the one or more agents in the environment.

In some implementations, the network input comprises a respective concatenation of a plurality of channels corresponding to each agent and the vehicle, and wherein, in each concatenation: each channel is represented as a two-dimensional array of data values; each position in each channel corresponds to a respective location in the environment; corresponding positions in different channels correspond to the same location in the environment; the channels comprise a time channel and a respective motion channel corresponding to each motion parameter in the predetermined set of motion parameters; and for each particular location in the environment occupied by the agent or vehicle at a particular time point: the position in the time channel time channel time channel which corresponds to the particular location defines the particular time point; and for each motion channel, the position in the motion channel which corresponds to the particular location defines the value of the motion parameter corresponding to the motion channel at the particular time point.

In some implementations, the predetermined set of motion parameters comprises at least one of: a heading of the agent or vehicle at the time point, a velocity of the agent or vehicle at the time point, or an acceleration of the agent or vehicle at the time point.

In some implementations, the cut-in output comprises a two-dimensional array of data values, wherein each position in the array corresponds to a respective location in the environment, and wherein the data values each characterize the cut-in probability of the respective location.

In some implementations, the method further comprises generating cut-in neural network features, comprising one or more of: extracting features from the cut-in output, or extracting features from one or more intermediate outputs of the neural network; and generating agent cut-in probabilities for one or more agents in the environment using the cut-in neural network features.

In some implementations, the features extracted from the cut-in output include one or more of: an average cut-in probability of a plurality of locations in a predetermined region of the environment, or a maximum cut-in probability of a plurality of locations in a predetermined region of the environment.

In some implementations, generating the agent cut-in probabilities using the cut-in neural network features comprises providing the cut-in neural network features as a first input to a different cut-in machine learning model that operates on the cut-in neural network features and other features of the agent, other features of the vehicle, or both.

In some implementations, the different cut-in machine learning model is a random decision forest.

In some implementations, the method further comprises calculating a respective initial agent cut-in probability for each of the one or more agents, comprising: receiving data specifying one or more predicted paths for the agent, the predicted paths comprising one or more predicted future locations; receiving data specifying a respective predicted path probability for each of the one or more predicted paths of the agent, wherein the predicted path probability for a given predicted path characterizes a likelihood that the agent will travel on the predicted path; determining which of the predicted paths intersect with a planned future location of the vehicle in the predetermined amount of time; and generating the respective initial agent cut-in probability by combining the respective predicted path probabilities of those predicted paths that intersect with a planned future location of the vehicle; and providing the initial agent cut-in probabilities as a second input to the random decision forest.

In some implementations, the method further comprises: for each of the one or more surrounding agents, extracting one or more features characterizing a predicted path of the surrounding agent from the predicted path of the surrounding agent, wherein the one or more features comprise one or more of: a nearest collision time with the vehicle, a nearest collision time with one or more other surrounding agents, one or more features related to a traffic light, one or more features related to a stop sign, or a maximum lateral acceleration of the surrounding agent; and providing the one or more features characterizing a predicted path of each surrounding agent as a third input to the different cut-in machine learning model.

In some implementations, the method further comprises determining one or more features characterizing a surrounding agent, wherein the one or more feature comprise one or more of: a velocity of the surrounding agent, an acceleration of the surrounding agent, or a heading of the surrounding agent; and providing the one or more features characterizing the surrounding agent as a fourth input to the different cut-in machine learning model.

According to a second embodiment, there is provided a system comprising one or more computers and one or more storage devices storing instructions that are operable, when executed by the one or more computers, to cause the one or more computers to perform the method of any one of the implementations of the first embodiment.

According to a third embodiment, there is provided one or more non-transitory storage media storing instructions that when executed by one or more computers cause the one or more computers to perform the method of any one of the implementations of the first embodiment.

Particular embodiments of the subject matter described in this specification can be implemented so as to realize one or more of the following advantages.

Some existing techniques for predicting cut-ins rely on predicted future paths of surrounding agents. For a given surrounding agent, a separate prediction system would generate one or more predicted future paths of the agent, each with a respective probability. A cut-in prediction system would then receive these predicted paths and infer a cut-in probability from them. The cut-in prediction system, therefore, was not trained directly on positive and negative cut-in training examples, but rather the predictions were inferred indirectly. In some embodiments described in this specification, the cut-in neural network is trained directly on cut-in training examples generated by vehicles operating in the real world. Particularly, these cut-in training examples were gathered over many driving hours and by many different autonomous vehicles. This direct training can yield more accurate predictions, and allow the vehicle to predict potential cut-ins earlier, i.e., farther in advance of a potential impact, than existing techniques.

Training a cut-in neural network directly on cut-in training examples can also greatly simplify the problem of predicting cut-ins; some existing techniques require a cut-in prediction system to explicitly model complex behaviors of surrounding agents. There are many modes of failure inherent in some such techniques. As a particular example, some existing techniques might not predict a surrounding agent to execute an illegal maneuver that causes the surrounding agent to cut in front of the vehicle. Some embodiments of a cut-in neural network as described in this specification have been shown to be able to capture such cases.

In some embodiments described in this specification, a cut-in neural network can also learn non-linear features of the surrounding environment, characterizing interactions between one or more surrounding agents and the vehicle, that are important for predicting cut-in probabilities. The existing technique described above relies on the predicted future paths for a single isolated agent when generating a cut-in prediction for that agent, and cannot take non-linear interactions into account.

In some embodiments described in this specification, the cut-in neural network is a part of a larger cut-in prediction pipeline, where it is combined with other cut-in prediction engines to generate a cut-in prediction that is more accurate than existing techniques.

In some embodiments described in this specification, a cut-in prediction system can generate respective cut-in probabilities for each of one or more surrounding agents. This is an improvement on existing techniques, some of which could only generate a prediction for a single surrounding agent, and others of which could only generate an overall probability that a cut-in would occur without specifying the particular surrounding agent that would be responsible.

In some embodiments described in this specification, the cut-in neural network uses a data representation system to generate trajectory representation data which defines the trajectory of the vehicle and the trajectories of one or more surrounding agents as a collection of two-dimensional (2D) "channels". The cut-in neural network can process the trajectory representation data, e.g., using a convolutional neural network, to generate an output that defines respective cut-in predictions for each of the surrounding agents. The representation of the trajectories as a collection of 2D channels is more compact than a representation as a collection of 3D channels, e.g., sequences of video frames. Further, unlike a 1D representation, e.g., such as a feature vector, the 2D channels can be processed by multi-dimensional convolutional filters in the convolutional neural network. Therefore, the cut-in neural network may consume fewer computational resources (e.g., memory, computing power, or both) by representing the trajectories as a collection of 2D channels than would be the case if the on-board system represented the trajectories as a collection of 3D channels. Moreover, the convolutional neural network can learn to exploit complex interactions between different spatial regions of the trajectory representation data by processing the collection of 2D channels representing the trajectories using multi-dimensional convolutional filters and thereby generate more accurate cut-in predictions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "cut-in neural network," to predict whether one or more surrounding agents are going to cut in front of the vehicle. In this specification, to "cut in front of" a vehicle will refer to entering a planned path of a vehicle within a certain amount of time. For example, if the planned path of a vehicle includes a right turn, then an agent can cut in front of the vehicle by entering the path that the vehicle plans to travel following the right turn, even if the vehicle has not executed the right turn yet. In this specification, a "surrounding agent" can refer, without loss of generality, to a vehicle, bicycle, pedestrian, ship, drone, or any other moving object. This specification also describes how training examples generated by vehicles can be used to effectively train the cut-in neural network to accurately and reliably make predictions.

Figure 1:
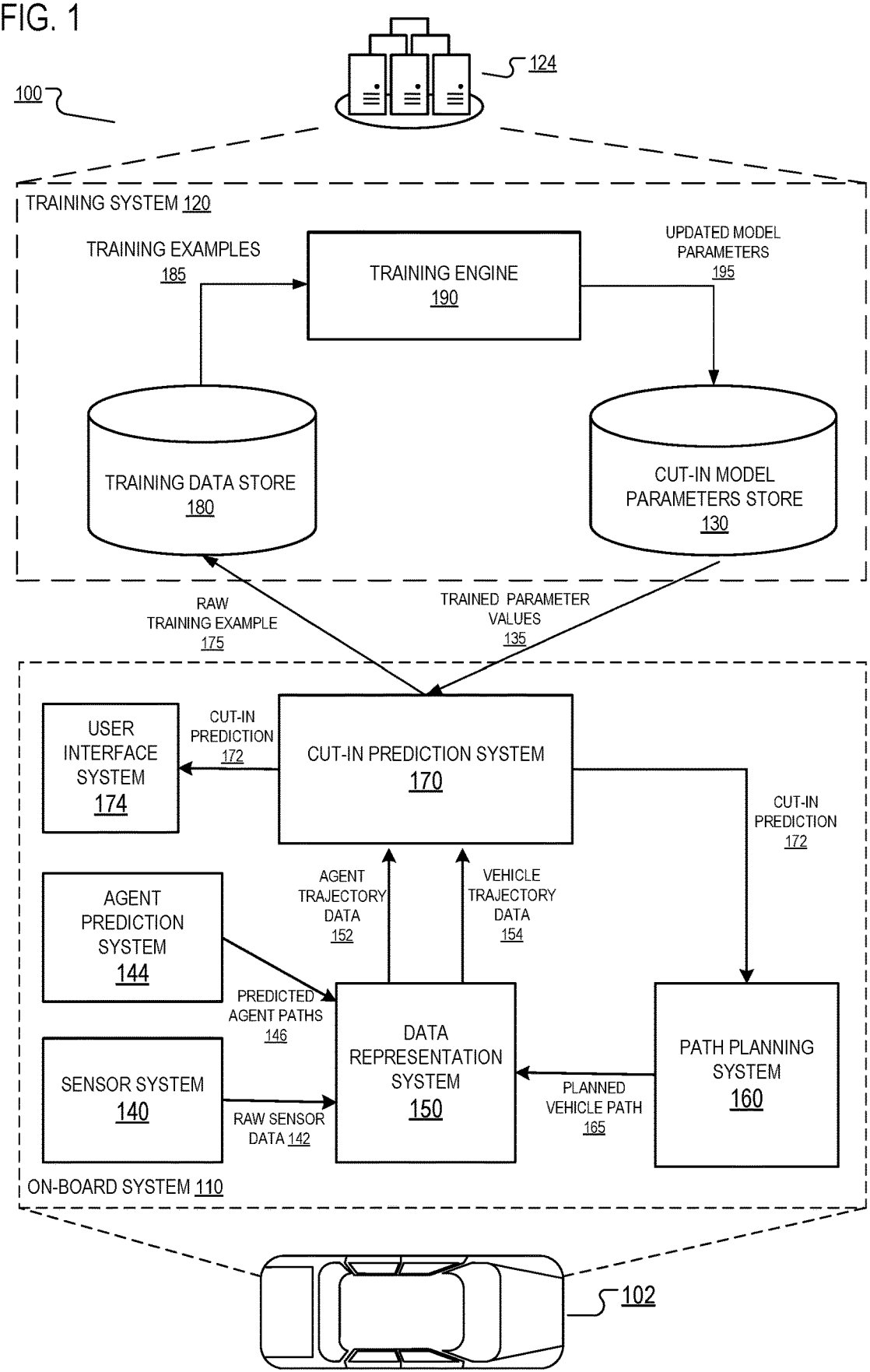
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle. The on-board system 110 includes one or more sensor subsystems 140. The sensor subsystems 140 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 140 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 140 classify a one or more groups of raw sensor measurements as being measures of respective other agents, the sensor subsystems 140 can compile the raw sensor measurements into a set of raw data 142, and send the raw data 142 to a data representation system 150.

The on-board system 110 also includes an agent prediction system 144. For every surrounding agent that the sensor subsystems 140 detect, the agent prediction system 144 generates a predicted agent path. A predicted agent path characterizes a path that a surrounding agent is predicted to take in the future. The agent prediction system sends all predicted agent paths 146 to the data representation system 150.

The on-board system 110 also includes a path planning system 160. The path planning system 160 generates a planned vehicle path 165 that characterizes a path that the vehicle 102 will take in the future. The path planning system 160 sends the planned vehicle path 165 to the data representation system 150.

The data representation system 150, also on-board the vehicle 102, receives the raw sensor data 142 from the sensor system 140 and the predicted agent paths from the agent prediction system 144, and generates agent trajectory data 152. The agent trajectory data 152 can characterize, for each surrounding agent, a current state at the current time point, a previous state at one or more respective previous time points, and a predicted future state at one or more respective future time points. The state of an agent at a given time point can include the location of the agent at the given time point, as well as values for a predetermined set of motion parameters. The motion parameters can include a heading for the agent, a velocity of the agent, and an acceleration of the agent. An example data representation system 150 and agent trajectory data 152 is described in more detail below in reference to FIG. 2B.

The data representation system 150 also receives the planned vehicle path 165 from the path planning system 160, and generates vehicle trajectory data 154. Similarly to the agent trajectory data 152, the vehicle trajectory data 154 can characterize, for the vehicle, a current state at the current time point, a previous state at one or more respective previous time points, and a planned future state at one or more respective future time points. In some implementations, the vehicle trajectory data 154 can characterize multiple possible planned future states for each of the future time points. The data representation system 150 can recall previous states of the vehicle 102 in order to generate the vehicle trajectory data 154. An example data representation system 150 and vehicle trajectory data 152 is described in more detail below in reference to FIG. 2A.

The data representation system 150 provides the agent trajectory data 152 and the vehicle trajectory data 154 to a cut-in prediction system 170, also on-board the vehicle 102. The cut-in prediction system uses the trajectory data to generate a cut-in prediction 172 that predicts whether one or more of the surrounding agents will cut in front of the vehicle 102 within a predetermined amount of time, e.g., 3 seconds or 5 seconds. This process is described in more detail below in reference to FIG. 4.

The on-board system 100 can provide the cut-in prediction 172 generated by the cut-in prediction system 170 to the path planning system 160, a user interface system 174, or both.

When the path planning system 160 receives the cut-in prediction 172, the path planning system 160 can use the cut-in prediction 172 to generate a new planned vehicle path that characterizes a path that the vehicle 102 will take in the future. For example, the cut-in prediction 172 may contain a prediction that a particular surrounding agent is likely to cut in front of the vehicle 102, potentially causing a collision. In this example, the path planning system 160 can generate a new planned vehicle path that avoids the potential collision. That is, the path planning system 160 can modify the planned future trajectory of the vehicle 102 to avoid a potential collision that may be caused by a likely cut-in from another agent.

When the user interface system 174 receives the cut-in prediction 172, the user interface system 174 can use the cut-in prediction 172 to present information to the driver of the agent 102 to assist the driver in operating the agent 102 safely. The user interface system 174 can present information to the driver of the agent 102 by any appropriate means, for example, by an audio message transmitted through a speaker system of the agent 102 or by alerts displayed on a visual display system in the agent (e.g., an LCD display on the dashboard of the agent 102). In a particular example, the cut-in prediction 172 may contain a prediction that a particular surrounding agent is likely to cut in front of the agent 102, potentially causing a collision. In this example, the user interface system 174 can present an alert message to the driver of the agent 102 with instructions to adjust the trajectory of the agent 102 to avoid a collision or notifying the driver of the agent that a collision with the particular surrounding agent is likely.

To generate the cut-in prediction 172, the cut-in prediction system 170 can use trained parameter values 135 that it obtains from a cut-in model parameters store 130 in the training system 120.

The training system 120 is typically hosted within a data center 124, which can be a distributed computing system having hundreds or thousands of computers in one or more locations.

The training system 120 includes a training data store 180 that stores all the training data used to train the parameter values of the cut-in prediction system 170. The training data store 180 receives raw training examples from agents operating in the real world. For example the training data store 180 can receive a raw training example 175 from the agent 102 and one or more other agents that are in communication with the training system 120. The raw training example 175 can be processed by the training system 120 to generate a new training example. The raw training example 175 includes the agent trajectory data 152 and the vehicle trajectory data 154 that together can be used as the input for the new training example. The raw training example 175 also includes outcome data characterizing whether one or more surrounding agents actually cut in front of the vehicle 102 within the predetermined amount of time for which the cut-in prediction 172 was generated. This outcome data can be used to generate a ground-truth output for the new training example. The process for generating a new training example from a raw training example is described in more detail below in reference to FIG. 9.

The training data store 180 provides training examples 185 to a training engine 190, also housed in the training system 120. The training engine uses the training examples 185 to update model parameters that will be used by the cut-in prediction system 170, and provides the updated model parameters 195 to the cut-in model parameters store 130. Once the parameter values of the cut-in prediction system 170 have been fully trained, the training system 120 can send the trained parameter values 135 to the cut-in prediction system 170, e.g., through a wired or wireless connection.

Figure 2A:
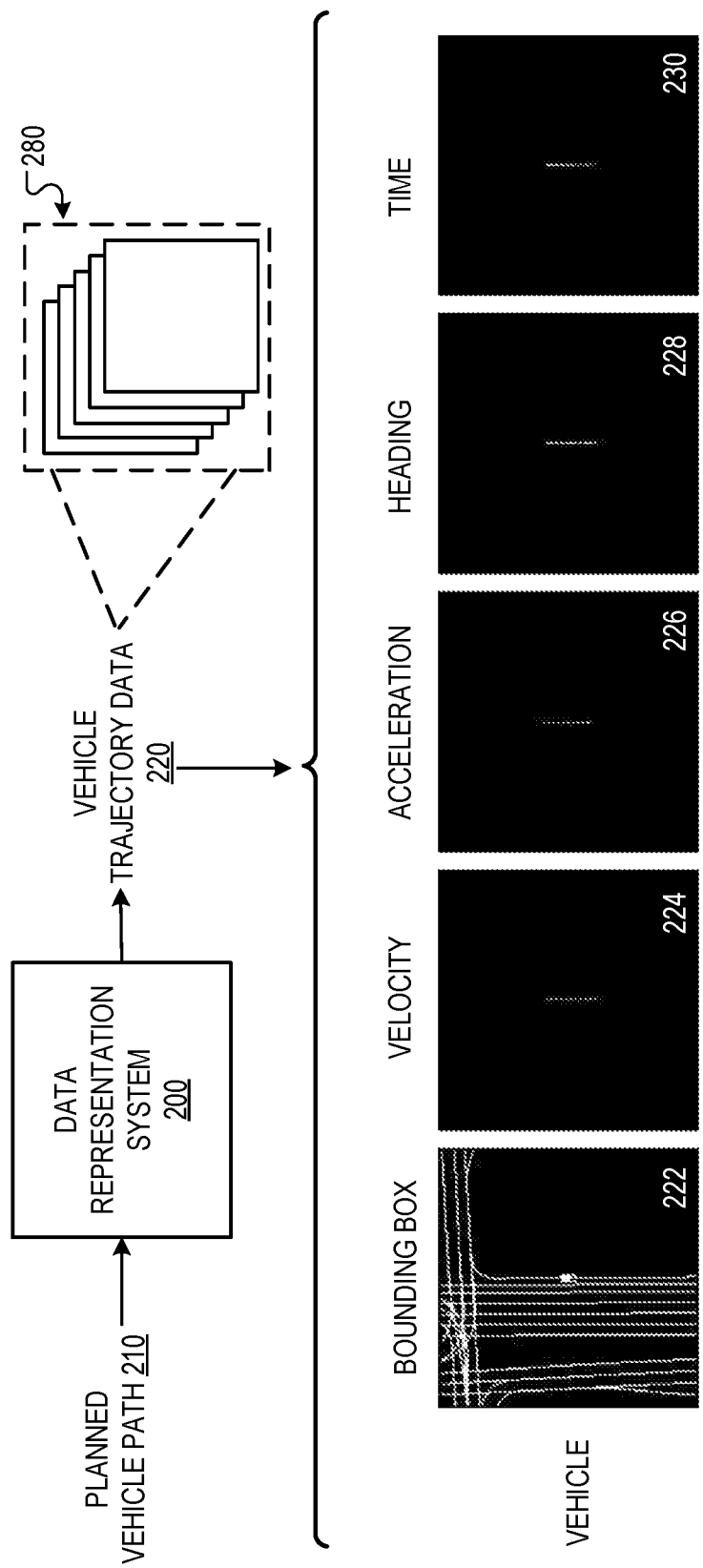
FIG. 2A is a block diagram of an example data representation system for generating vehicle trajectory data.

FIG. 2A is a block diagram of an example data representation system 200 for generating vehicle trajectory data 220. The data representation system 200 is an example of a system implemented as computer programs on one or more computers in one or more locations in which the systems, components, and techniques described below are implemented.

The data representation system 200 processes a planned vehicle path 210, which characterizes a path that a vehicle plans to travel, to generate the vehicle trajectory data 220. The data representation system 200 can also recall a previous vehicle path, which characterizes a path that the vehicle has previously travelled, to generate the vehicle trajectory data 220.

The vehicle trajectory data 220 is composed of multiple "channels". Each channel is a two-dimensional array of data values that represents a "top-down" perspective of the environment in the vicinity of the vehicle. Each position in each channel corresponds to a respective location in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same location in the environment. In other words, corresponding positions in different channels correspond to the same location in the environment.

To represent the trajectory of the vehicle, the vehicle trajectory data 220 includes a vehicle time channel and respective vehicle motion parameter channels corresponding to each of a predetermined number of motion parameters. Each of the motion parameters characterizes a respective characteristic of the motion of the vehicle, for example, the velocity, acceleration, or heading of the vehicle. As depicted in FIG. 2A, the vehicle trajectory data 220 may include a vehicle time channel 230, a vehicle velocity channel 224, a vehicle acceleration channel 226, and a vehicle heading channel 228.

The vehicle time channel and the vehicle motion parameter channels represent the previous trajectory of the vehicle up to and including the current time point and a planned future trajectory of the vehicle after the current time point, derived from the planned vehicle path 210. More specifically, a planned future trajectory of the vehicle specifies, for each of multiple future time points after the current time point, a location in the environment that can be occupied by the vehicle at the future time point. For each of the multiple future time points, the planned future trajectory further specifies possible values of each of the predetermined number of motion parameters that characterize the motion of the vehicle at the future time point.

In some implementations, the planned vehicle path 210 includes multiple possible future paths of the vehicle. That is, for each future time point, the planned vehicle path 210 specifies multiple possible locations in the environment that can be occupied by the vehicle at the future time point, and multiple possible values for each of the motion parameters. In these cases, the generated vehicle trajectory data 220 can characterize each possible future trajectory of the vehicle.

The description which follows will refer to the previous vehicle trajectory up to and including the current time point and the planned future vehicle trajectory after the current time point together as the "full trajectory" of the vehicle.

The vehicle time channel represents the respective time points at which the vehicle occupies different locations in the environment in the full trajectory of the vehicle. Each motion parameter channel represents the values of the respective motion parameter characterizing the motion of the vehicle when the vehicle occupies different locations in the environment in the full trajectory of the vehicle. In particular, for each location in the environment which is occupied by the vehicle, the data value in the vehicle time channel which corresponds to the location defines the time point at which the vehicle occupies the location. Moreover, the data value in each respective vehicle motion parameter channel which corresponds to the location defines the value of the respective motion parameter characterizing the motion of the vehicle when the agent occupies the location in the environment.

Generally, the environment may include multiple locations which are not included in either the previous trajectory or the candidate future trajectory of the agent. For these locations, the data representation system 200 can set the data values in the vehicle time channel and the vehicle motion parameter channels which correspond to these locations to a default value (e.g., the value 0 or the value −1).

When the same location in the environment is occupied by the vehicle at multiple time points, then the data representation system 200 can set the respective data values in the vehicle time channel and motion parameter channels which correspond to the location to any appropriate values. For example, the data representation system 200 can set the respective data values in the vehicle time channel and motion parameter channels which correspond to the location in accordance with the last time point when the vehicle occupies the location. That is, the data representation system 200 can set the data value in the vehicle time channel which corresponds to the location to define the last time point when the vehicle occupies the location. Moreover, the data representation system 200 can set the respective data values in the vehicle motion parameter channels to define the values of the respective motion parameters characterizing the motion of the vehicle when the vehicle last occupies the location.

In some implementations, the data representation system 200 can include further channels in the vehicle trajectory data 220 in addition to the time channels and motion parameter channels. For example, the vehicle trajectory data 220 can include a road-graph channel, a vehicle localization channel, or both. A road-graph channel represents a known geometry of the environment in the vicinity of the vehicle. For example, the road-graph channel may represent the positions of different features of the environment, including: the road, different lanes in the road, crosswalks, traffic lights, construction zones, school zones, and the like. A vehicle localization channel represents the location of the vehicle in the environment at the current time point (e.g., as defined by a bounding box). In the example depicted in FIG. 2A, the road-graph channel and the vehicle localization channel are superimposed onto a single channel 222.

Figure 2B:
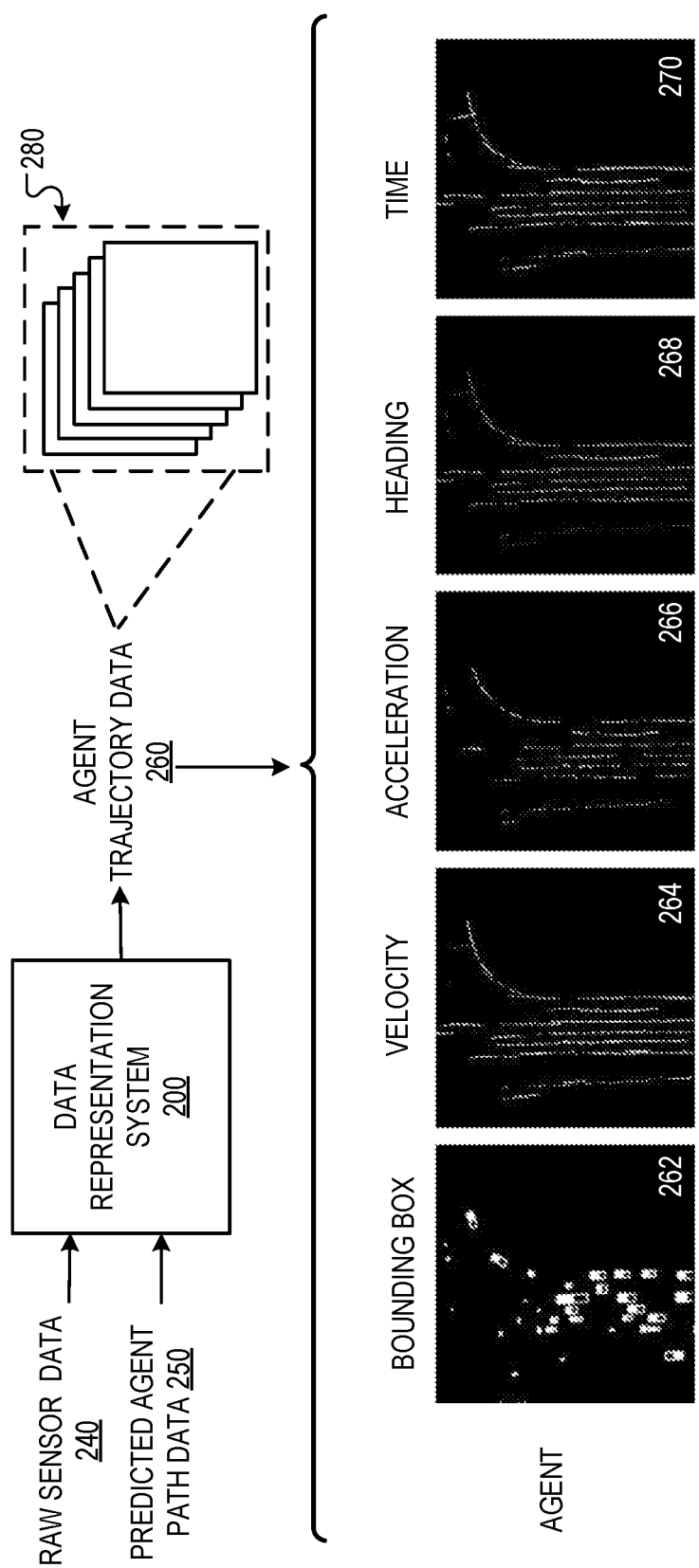
FIG. 2B is a block diagram of an example data representation system for generating agent trajectory data.

FIG. 2B is a block diagram of an example data representation system 200 for generating agent trajectory data 260. The data representation system 200 is an example of a system implemented as computer programs on one or more computers in one or more locations in which the systems, components, and techniques described below are implemented.

The data representation system 200 processes raw sensor data 240 and predicted agent path data 250 to generate the agent trajectory data 260, which characterizes agents in the environment in the vicinity of the vehicle.

To represent the trajectories of the surrounding agents, the agent trajectory data 260 includes an agent time channel and respective agent motion parameter channels corresponding to each of the predetermined number of motion parameters. As depicted in FIG. 2B, the agent trajectory data 260 may include an agent time channel 270, an agent velocity channel 364, an agent acceleration channel 266, and an agent heading channel 268.

The agent time channel and the agent motion parameter channels jointly represent the previous trajectories of the agents up to the current time point and the predicted future trajectories of the agents after the current time point, derived from the predicted agent path data 250. A predicted future trajectory of an agent specifies, for each of multiple future time points after the current time point, a location in the environment that can be occupied by the agent at the future time point. For each of the multiple future time points, the predicted future trajectory further specifies possible values of each of the predetermined number of motion parameters that characterize the motion of the agent at the future time point. The description which follows will refer to the previous agent trajectories up to and including the current time point and the planned future agent trajectories after the current time point together as the "full trajectory" of the agents.

The agent time channel jointly represents the respective time points at which the agents occupy different locations in the environment in the full trajectories of the agents. Each agent motion parameter channel represents the values of the respective motion parameters characterizing the motion of the agents when the agents occupy different locations in the environment in the full trajectories of the agents. In particular, for each location in the environment which is occupied by one of the agents, the data value in the agent time channel which corresponds to the location defines the time point at which the agent occupies the location. Moreover, the data value in each respective agent motion parameter channel which corresponds to the location defines the value of the respective motion parameter characterizing the motion of the agent when the agent occupies the location in the environment.

Generally, the environment may include multiple locations which are not included in either the previous trajectory or the predicted future trajectory of any of the agents. For these locations, the data representation system 200 can set the data values in the agent time channel and the agent motion parameter channels which correspond to these locations to a default value (e.g., the value 0 or the value −1).

When the same location in the environment is occupied by agents at multiple time points, then the data representation system 200 can set the respective data values in the agent time channel and agent motion parameter channels which correspond to the location to any appropriate values. For example, the data representation system 200 can set the respective data values in the agent time channel and agent motion parameter channels which correspond to the location in accordance with the last time point when one of the agents occupies the location.

In some implementations, an agent localization channel (e.g., the agent localization channel 262) jointly represents the positions of each of the vehicles in the environment at the current time point (e.g., as defined by bounding boxes).

By jointly representing the trajectories of the agents using a single agent time channel and a single agent motion parameter corresponding to each motion parameter, the data representation system 200 can generate agent trajectory data 260 with a predetermined dimensionality irrespective of the (variable) number of agents. In this manner, the agent trajectory data 260 generated by the data representation system 200 can be readily processed by a cut-in prediction system, which is configured to process agent trajectory data 260 of the predetermined dimensionality.

Referring to FIGS. 2A and 2B together, in some implementations the data representation system 200 generates the vehicle trajectory data 220 and the agent trajectory data 260 together by aligning and channel-wise concatenating the generated channels, as depicted by 280 in both FIG. 2A and FIG. 2B. That is, combined trajectory data is generated by concatenating all generated channels. By implicitly representing the respective trajectories of the vehicle and the agents in this format, the data representation system 200 can generate a representation which is both compact and can be effectively processed by a cut-in prediction system. In particular, the cut-in prediction system may include a convolutional neural network. The cut-in prediction system can process the combined trajectory data using convolutional neural network layers defined by multi-dimensional (e.g., two- or three-dimensional) convolutional filters, thereby enabling the cut-in prediction system to learn complex spatial relationships between different spatial regions of the environment.

Figure 3:
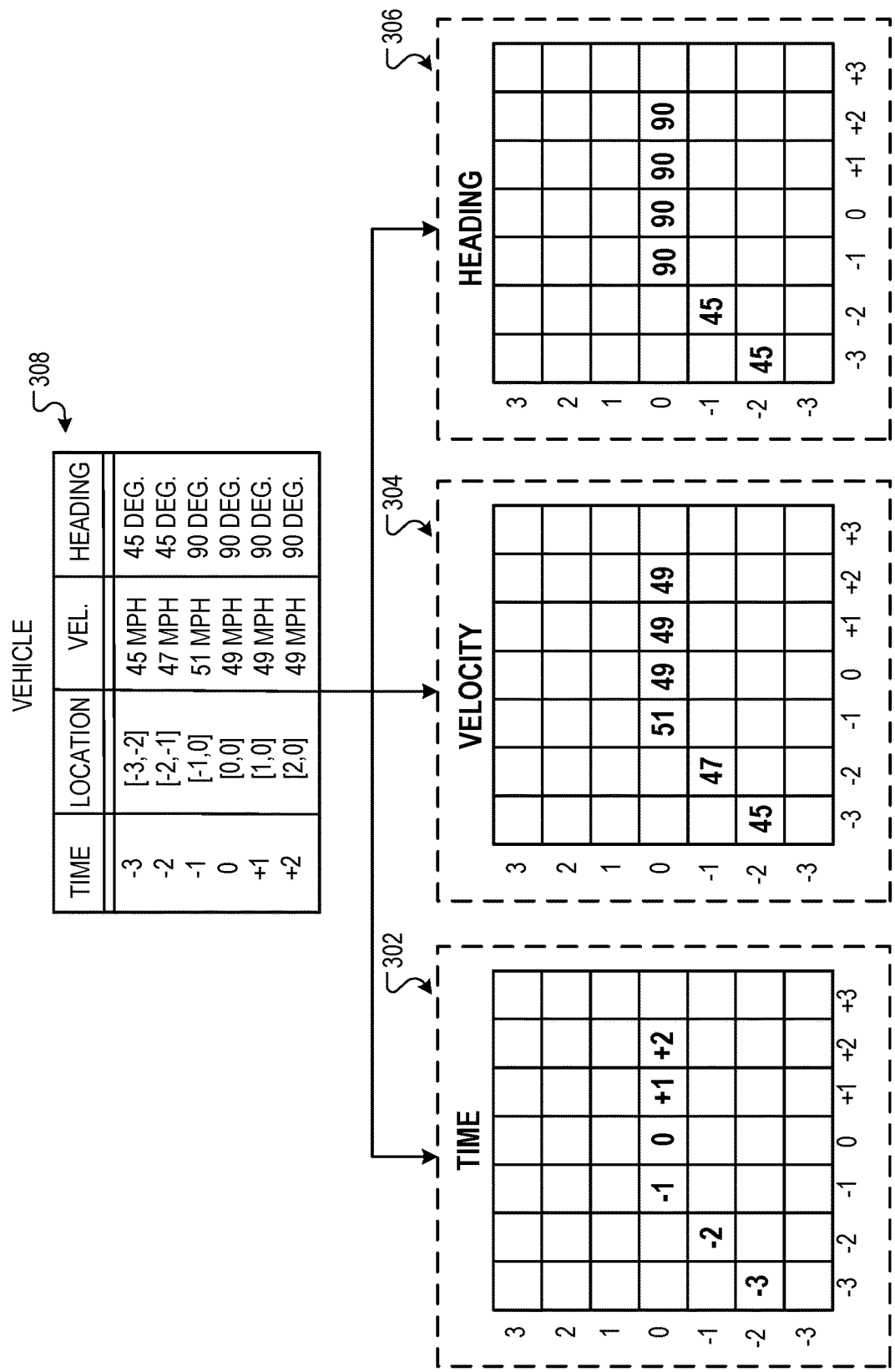
FIG. 3 is an illustration of an example process by which a data representation system can generate channels.

FIG. 3 is an illustration of an example process by which a data representation system can generate a vehicle time channel 302, a vehicle velocity channel 304, and a vehicle heading channel 306, which represent a trajectory of the vehicle up to and including the current time point and a planned future trajectory of the vehicle after the current time point.

The data which defines the previous trajectory of the vehicle and the planned future trajectory of the vehicle is represented in a tabular format 308. Each row of the table defines a time point, a location the vehicle occupies in the environment at the time point, a velocity of the vehicle at the time point, and a heading of the vehicle at the time point.

For example, the first row of the table 308 defines that at time point −3 (e.g., 3 seconds before the current time point), the location occupied by the vehicle in the environment is defined by the coordinates [−3,−2] in the channel frame of reference, the velocity of the vehicle is 45 mph, and the heading of the vehicle is 45 degrees (e.g., clockwise from North). The coordinates [−3,−2] are expressed in the channel frame of reference and can be mapped to express a location in an environment frame of reference. For example, the coordinates in the channel frame of reference may represent 5 foot increments in a North-South-East-West environment frame of reference which is centered on the vehicle. In this example, the coordinates [−3,−2] in the channel frame of reference may represent a location in the environment which is 15 feet West and 10 feet South of the location occupied by the vehicle at the current time point. As another example, the last row of the table 308 defines that at time point +2 (e.g., 2 seconds after the current time point), the location the vehicle occupies (i.e., according to the planned future trajectory) is defined by the coordinates [2,0] in the channel frame of reference, the velocity of the agent is 49 mph, and the heading of the agent is 90 degrees.

The data representation system sets the data values in the vehicle time channel corresponding to locations [−3,−2], [−2,−1], [−1,0], [0,0], [1,0], and [2, 0] to the respective time points −3, −2, −1, 0, +1, and +2 at which the vehicle occupies the respective locations. For clarity, the data values in the vehicle time channel corresponding to the other locations are shown as blank. Generally, the data representation system sets the data values in the vehicle time channel corresponding to the other locations to a default value (e.g., the value 0 or the value −1). Similarly, the data representation system sets the data values in the vehicle velocity channel corresponding to locations [−3,−2], [−2,−1], [−1,0], [0,0], [1,0], and [2, 0] to the respective velocity values 45, 47, 51, 49, 49, and 49 which define the velocity (in mph) of the vehicle when the vehicle occupies the respective locations. Similarly, the data representation system sets the data values in the vehicle heading channel corresponding to locations [−3,−2], [−2,−1], [−1,0], [0,0], [1,0], and [2, 0] to the respective heading values 45, 45, 90, 90, 90, and 90 which define the heading (in degrees) of the vehicle when the vehicle occupies the respective locations.

In some implementations, the data representation system determines the channel frame of reference to cause the location occupied by the vehicle at the current time point to correspond to the data value in the "center" of each of the channels. Generating trajectory data with a consistent channel frame of reference can facilitate training of the cut-in prediction system on the trajectory data.

Figure 4:
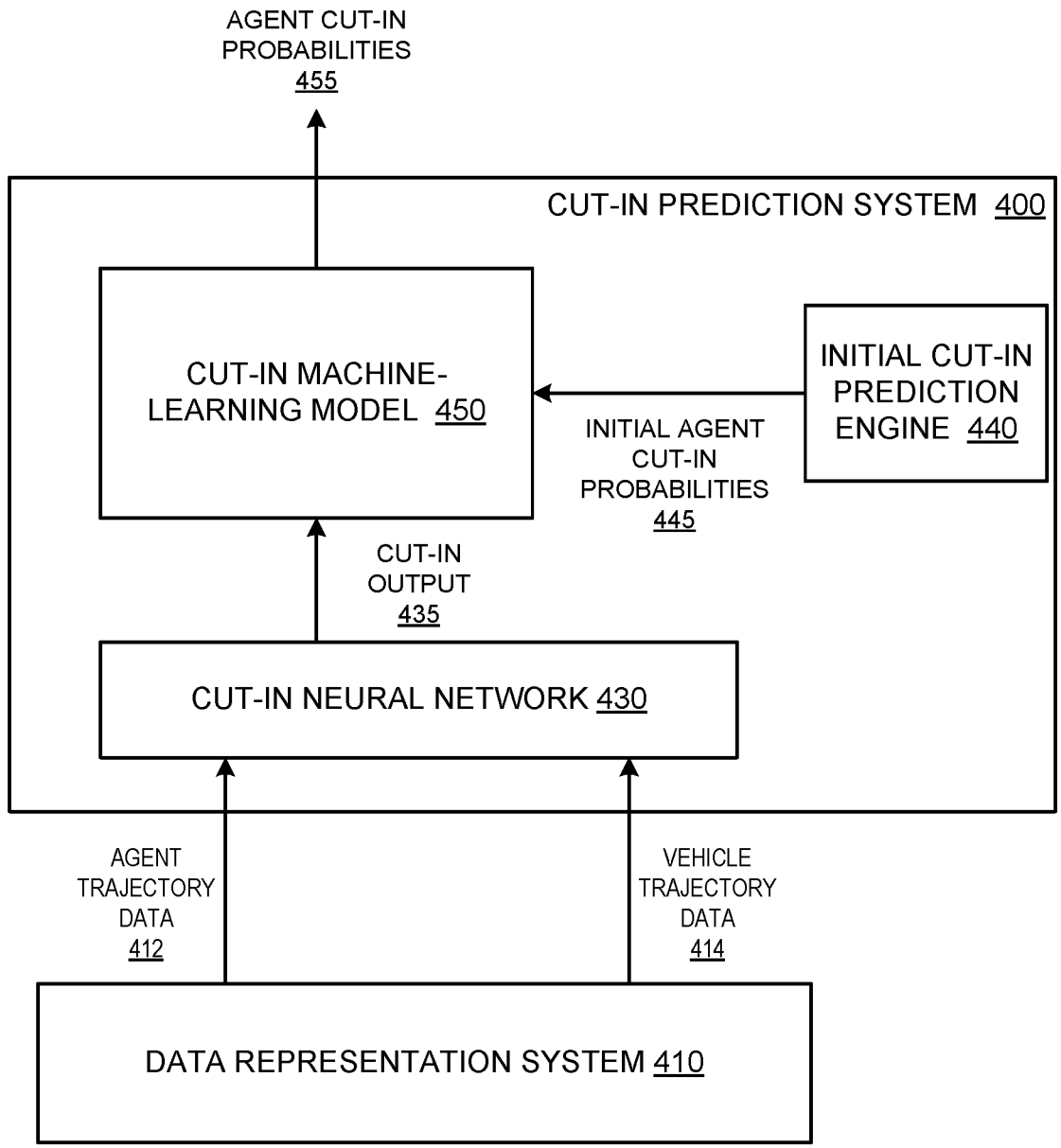
FIG. 4 is a block diagram of an example cut-in prediction system.

FIG. 4 is a block diagram of an example cut-in prediction system 400. The cut-in prediction system 400 is an example of a system implemented as computer programs on one or more computers in one or more locations in which the systems, components, and techniques described below are implemented.

A data representation system 410 provides agent trajectory data 412 and vehicle trajectory data 414 to the cut-in prediction system 400. For example, the data representation system might provide trajectory data in the channel format as described above in reference to FIGS. 2A, 2B, and 3.

A cut-in neural network 430 processes the agent trajectory data 412 and the vehicle trajectory data 414 to generate a cut-in output 435. In some implementations, the cut-in neural network 430 is a convolutional neural network. When the trajectory data is represented as two-dimensional arrays, e.g., the channels depicted in FIGS. 2A and 2B, such a convolutional neural network can learn to exploit complex interactions between different spatial regions of the trajectory data by processing the two-dimensional channels using multi-dimensional convolutional filters, thereby generating more accurate predictions.

The cut-in output 435 can include respective cut-in probabilities for one or more locations in the environment. A cut-in probability for a location occupied by a surrounding agent in the current time point characterizes a likelihood that the corresponding surrounding agent will cut in front of the vehicle within a predetermined amount of time. For example, a cut-in probability of 0.9 may represent that the cut-in neural network predicts that there is a 90% likelihood that the surrounding agent will cut in front of the vehicle within the predetermined amount of time.

In some implementations, the cut-in output 435 is a two-dimensional array of data values similar to the input trajectory data depicted in FIGS. 2A and 2B, where the array represents a "top-down" perspective of the environment in the vicinity of the vehicle. Each position in the array corresponds to a respective location in the environment, and the value at each position corresponds to the cut-in probability of the respective location. An example two-dimensional cut-in output is described in more detail below in reference to FIG. 5.

As a particular example, the cut-in neural network 430 can be a convolutional neural network with several convolutional layers and several max pooling layers that decrease the size of the input arrays. These convolutional layers can be followed by one or more fully-connected layers that can learn non-linear features of the input arrays. The network can then reshape the output of the full-connected layers into an output array. Finally, the network can have several transposed convolutional layers that increase the size of the output array, so that the cut-in output 435 is an array that is the same size as the input arrays.

In some implementations, the cut-in output 435 is the final output of the cut-in prediction system 400, and the cut-in output is used by the vehicle to make policy decisions, e.g., whether to change course to avoid a collision with a surrounding agent that is about to cut in. In some other implementations, e.g., the example in FIG. 4, the cut-in output 435 is used as an input to a different cut-in machine learning model 450.

The cut-in machine learning model 450 takes as input the cut-in output 435 (or data derived from the cut-in output 435) and other features, e.g., features of the surrounding agents and/or other features of the vehicle, and generates as output agent cut-in probabilities 455. An agent cut-in probability 455 characterizes the probability that a respective agent will cut in front of the vehicle in a predetermined amount of time.

In some implementations, the cut-in machine-learning model 450 extracts features from the cut-in output 435, and uses the extracted features to generate the agent cut-in probabilities. This process is described in more detail below in reference to FIG. 7.

In some implementations, the cut-in prediction system 400 also includes an initial cut-in prediction engine 440, which generates initial agent cut-in probabilities 445 that are also used as an input to the cut-in machine learning model 450. In some such implementations, the cut-in machine learning model 450 extracts other features from the initial agent cut-in probabilities 445, and uses the other extracted features as an input. This process is described in more detail below in reference to FIG. 8.

Figure 5:
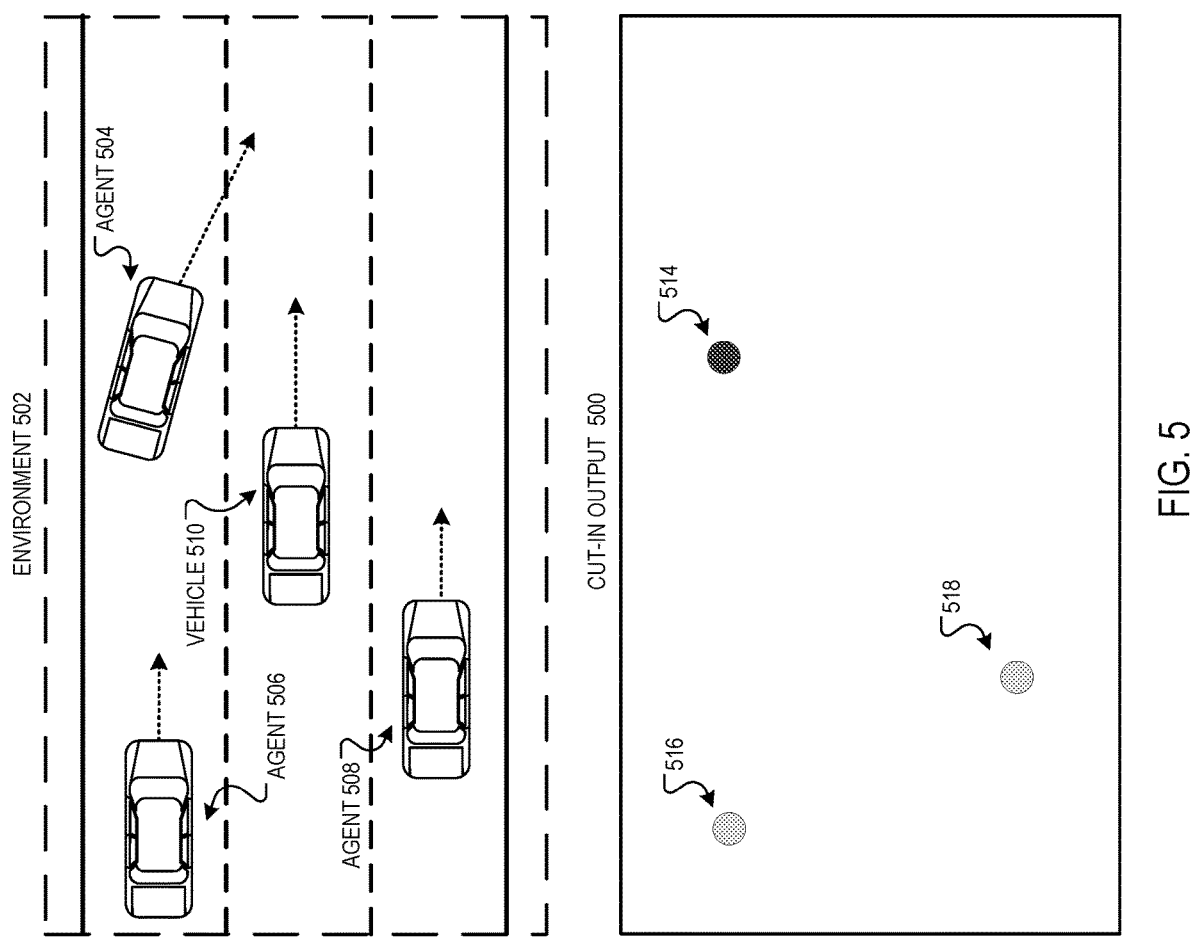
FIG. 5 is an illustration of an example cut-in output corresponding to an environment.

FIG. 5 is an illustration of an example cut-in output 500 corresponding to an environment 502.

The environment 502 contains a vehicle 510 and three surrounding agents 504, 506, and 508. The agent 504 appears likely to cut in front of the vehicle 510, while the agents 506 and 508 appear unlikely to cut in front of the vehicle 510.

The cut-in output 500 is an example two-dimensional array generated by a trained cut-in neural network, e.g., the cut-in neural network 430 in FIG. 4. The array represents a "top-down" perspective of the environment 502, where each position corresponds to a respective location in the environment 502. For example, a position 514 corresponds to the location occupied by the agent 504, a position 516 corresponds to the location occupied by the agent 506, and a position 518 corresponds to the location occupied by the agent 508.

In some implementations where the input to the cut-in neural network is trajectory data represented as two-dimensional arrays, e.g., the channels depicted in FIGS. 2A and 2B, the cut-in output array has the same dimensions as the input trajectory arrays, so that a position in the output array characterizes the same location in the environment as the corresponding position in the input array.

The value at each position corresponds to the cut-in probability of the respective location. In some implementations, an image can be created depicting the cut-in output, where a respective block of one or more pixels corresponds to each position in the array, and higher cut-in probabilities are depicted as darker grayscale values of the respective block of pixels. Such an image is useful during training of the cut-in neural network, e.g., to allow a user to visually inspect the progress of the training of the network.

For example, the position 514 has a dark grayscale value corresponding to a high cut-in probability, as the corresponding agent 504 has a high likelihood of cutting in. The positions 516 and 518 have light grayscale values corresponding to low cut-in probabilities, as the corresponding agents 506 and 508 have low likelihoods of cutting in.

In some implementations, the positions in the cut-in output that characterize locations in the environment not occupied by a surrounding agent can have a default value, e.g., 0, or a white or black grayscale value. During the course of training, the cut-in neural network learns to generate the default value for locations that are not occupied by an agent because the ground-truth outputs are formatted that way. In some other implementations, the cut-in neural network can be trained using a loss function that ignores the positions in the cut-in output that characterize locations in the environment not occupied by a surrounding agent, and so the cut-in neural network can assign any value to these locations.

Figure 6:
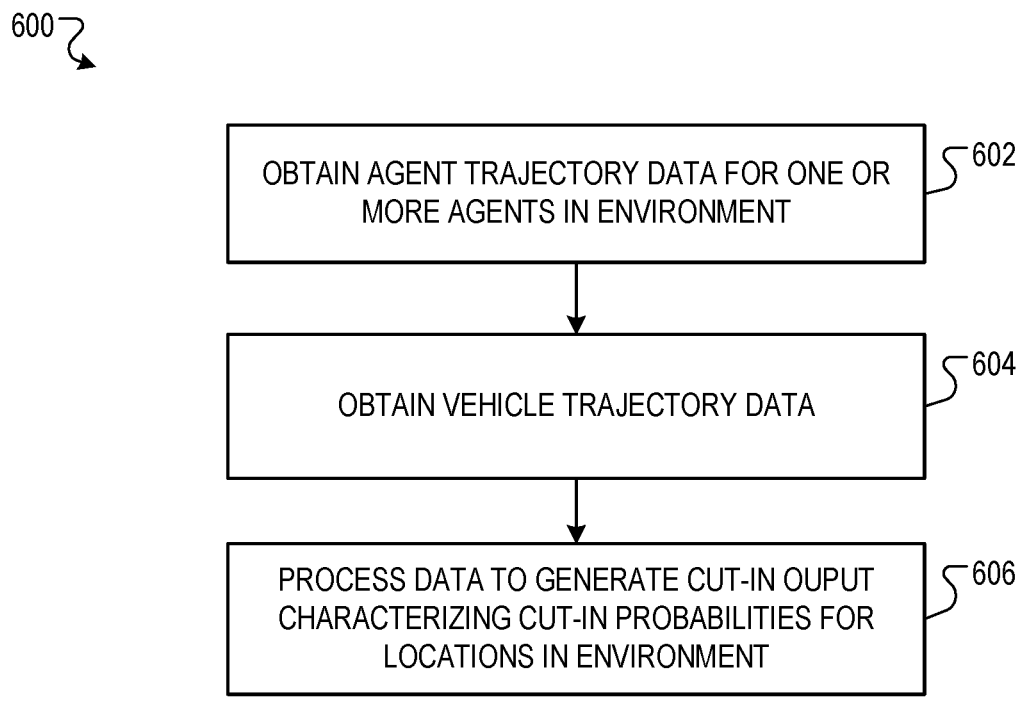
FIG. 6 is a flow diagram of an example process for generating a cut-in output.

FIG. 6 is a flow diagram of an example process 600 for generating a cut-in output. For convenience, the process 600 will be described as being performed by a system of one or more computers located in one or more locations. For example, an on-board system, e.g., the on-board system 110 of FIG. 1, appropriately programmed in accordance with this specification, can perform the process 600.

The system obtains agent trajectory data for one or more agents in the environment (step 602). As above, the agent trajectory data characterizes, for each agent surrounding a vehicle, a current state at the current time point, a previous state at one or more respective previous time points, and a predicted future state at one or more respective future time points. The state of an agent at a given time point can include the location of the agent at the given time point, as well as values for a predetermined set of motion parameters. Example agent trajectory data is described above in reference to FIG. 2B.

The system obtains vehicle trajectory data (step 604). As above, the vehicle trajectory data characterizes, for the vehicle, a current state at the current time point, a previous state at one or more respective previous time points, and a planned future state at one or more respective future time points. Example vehicle trajectory data is described above in reference to FIG. 2A.

The system processes the agent trajectory data and the vehicle trajectory data to generate a cut-in output (step 606). The cut-in output characterizes cut-in probabilities for one or more locations in the environment. An example cut-in output is described above in reference to FIG. 5.

Figure 7:
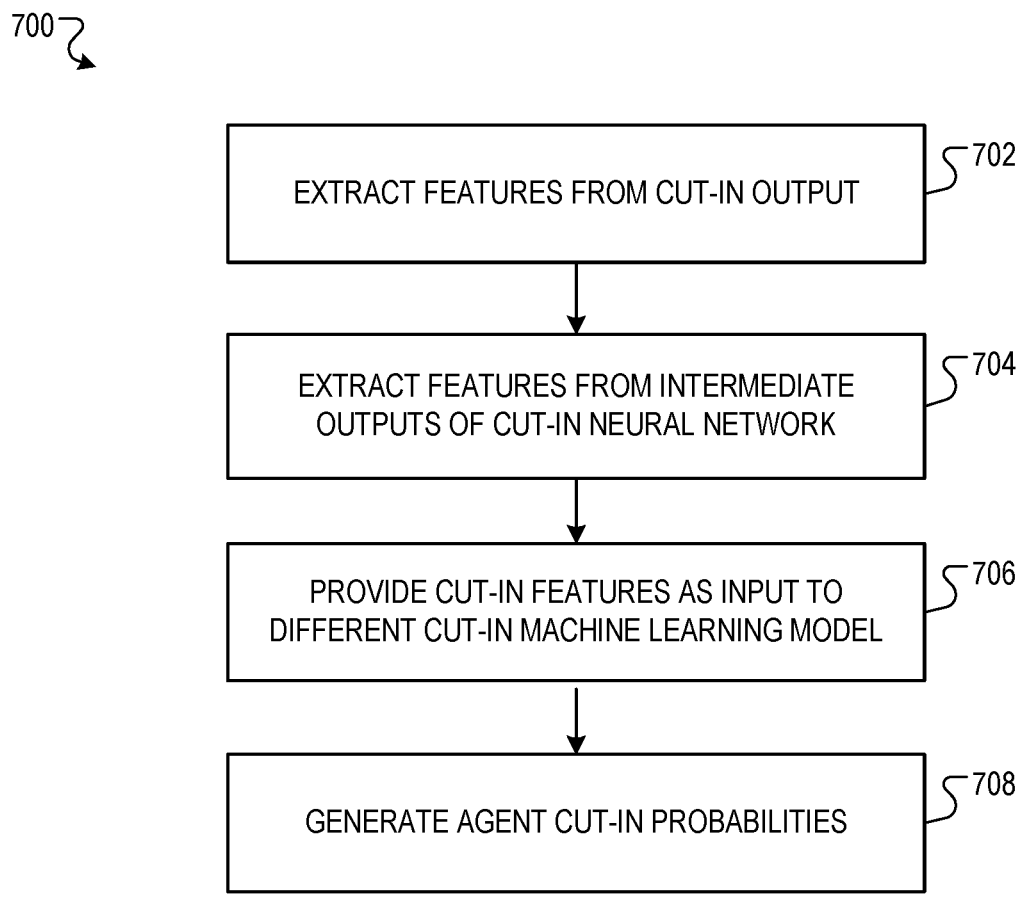
FIG. 7 is a flow diagram of an example process for extracting features from a cut-in output to generate agent cut-in probabilities.

FIG. 7 is a flow diagram of an example process 700 for extracting features from a cut-in output to generate agent cut-in probabilities. For convenience, the process 700 will be described as being performed by a system of one or more computers located in one or more locations. For example, a cut-in prediction system, e.g., the cut-in prediction system 400 of FIG. 4, appropriately programmed in accordance with this specification, can perform the process 700.

The system extracts features from the cut-in output (step 702). The cut-in output is the final output of a cut-in neural network, e.g., the cut-in neural network 430 of FIG. 4. The features extracted from the cut-in output can include an average cut-in probability of locations in a given region of the environment. For example, the system can calculate the average cut-in probability for all locations within 10 feet of a given surrounding agent, and an average cut-in probability for all locations within 20 feet of the given surrounding agent, and include both of these averages as features. The features can also include a maximum cut-in probability of locations in a given region of the environment. For example, the system can calculate the maximum cut-in probability for all locations within 10 feet of a given surrounding agent, and the maximum cut-in probability for all locations within 20 feet of the given surrounding agent, and include both of these maximum values as features. In some implementations, the system extracts a set of features for each surrounding agent using a portion of the cut-in output that characterizes a region of the environment that includes the surrounding agent.

The system extracts features from intermediate outputs of the cut-in neural network (step 704). For example, the features extracted from intermediate outputs might include the output of one of the intermediate layers of the cut-in neural network, because the intermediate layers can include useful information learned during training. The features extracted from the cut-in output and the features extracted from intermediate outputs are together called the "cut-in neural network features."

The system provides the cut-in neural network features to another cut-in machine learning model (706). The cut-in machine-learning model is different from the cut-in neural network, e.g., the cut-in machine learning model 450 of FIG. 4. In some implementations, the cut-in machine-learning model also takes as input initial agent cut-in probabilities that were generated by another initial cut-in prediction engine, e.g., the initial cut-in prediction engine 440 in FIG. 4. In some implementations, the cut-in machine learning model is a random decision forest or other decision-tree-based machine learning model.

The system generates agent cut-in probabilities for one or more surrounding agents using the cut-in machine learning model (step 708). As above, an agent cut-in probability characterizes the probability that a respective surrounding agent will cut in front of the vehicle in a predetermined amount of time.

Figure 8:
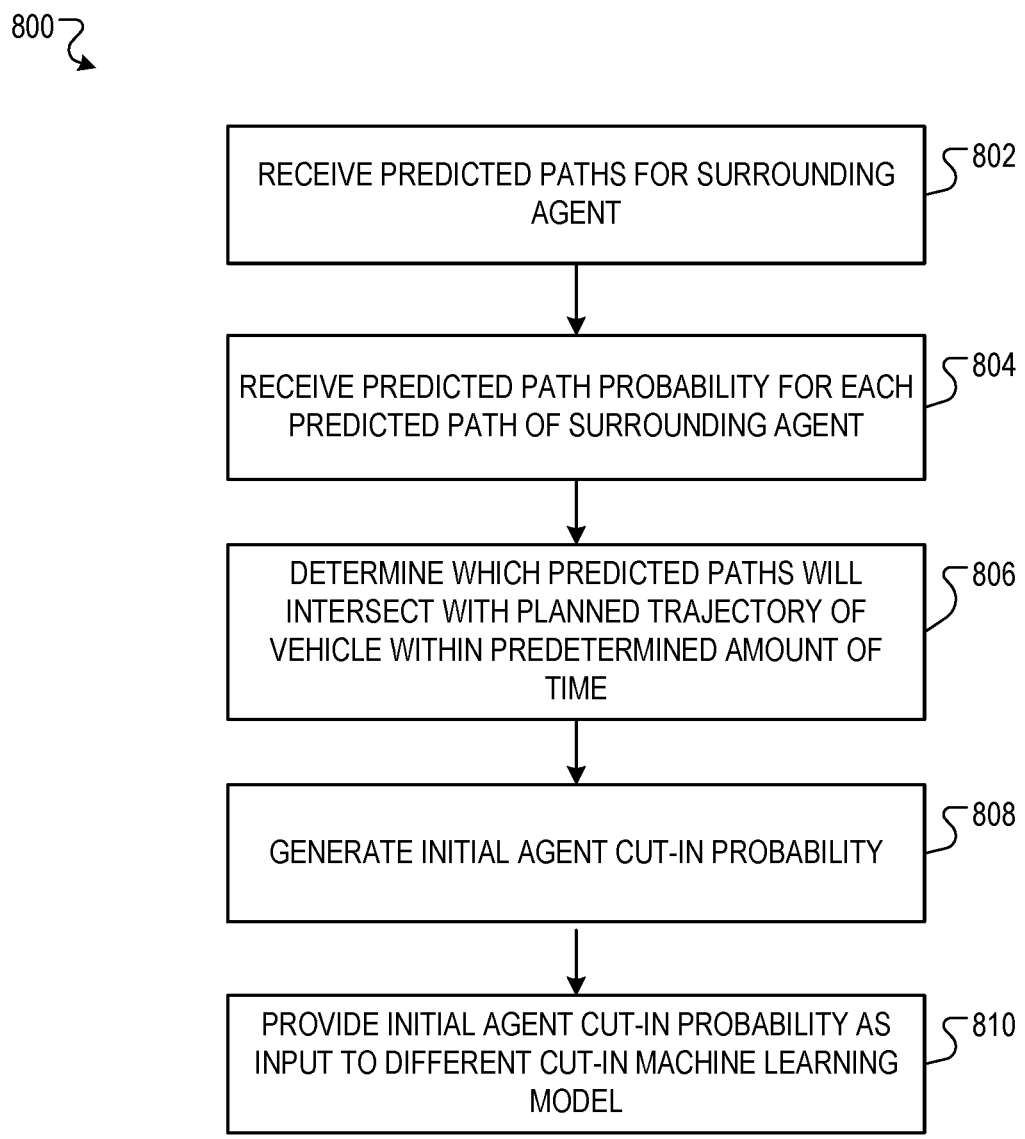
FIG. 8 is a flow diagram of an example process for generating initial agent cut-in probabilities.

FIG. 8 is a flow diagram of an example process 800 for generating initial agent cut-in probabilities. For convenience, the process 800 will be described as being performed by a system of one or more computers located in one or more locations. For example, an initial cut-in prediction engine, e.g., the initial cut-in prediction engine 440 of FIG. 4, appropriately programmed in accordance with this specification, can perform the process 800.

The system receives one or more predicted paths for a surrounding agent in the vicinity of a vehicle (step 802). The predicted paths characterize possible paths the surrounding agent will take, as predicted by the vehicle.

The system receives a predicted path probability for each predicted path of the surrounding agent (step 804). A respective predicted path probability of a predicted path characterizes the likelihood that the surrounding agent will take the predicted path.

The system determines which predicted paths will intersect the planned trajectory of the vehicle within a predetermined amount of time (step 806). The system can receive the planned trajectory of the vehicle from a path planning system of the vehicle, e.g., the path planning system 160 of FIG. 1.

The system generates an initial agent cut-in probability for the surrounding agent (step 808). In some implementations, the system sums the corresponding predicted path probabilities of those predicted paths that intersect the planned path of the vehicle, and outputs this sum as the initial agent cut-in probability. For example, there may be four predicted paths: Path A with probability 0.50, Path B with probability 0.30, Path C with probability 0.10, and Path D with probability 0.10. If only Path C and Path D intersect with the planned path of the vehicle, the system would determine the initial agent cut-in probability to be 0.20.

The system provides the initial cut-in probability to another cut-in machine learning model (step 810). The cut-in machine learning model is different from the initial cut-in prediction engine, e.g., the cut-in machine learning model 450 of FIG. 4. The cut-in machine learning model uses the initial agent cut-in probabilities to generate agent cut-in probabilities.

The cut-in machine learning model can also use other features in conjunction with the initial agent cut-in probabilities to generate the agent cut-in probabilities. For example, the cut-in machine learning model can use features extracted from a cut-in neural network, e.g., the cut-in neural network 430 of FIG. 4, to generate the agent cut-in probabilities.

In some implementations, the system can extract features from data characterizing each surrounding agent, and provide the extracted features to the cut-in machine learning model. For example, the system can extract a current velocity of each surrounding agent, a current acceleration of each surrounding agent, and/or a heading of each surrounding agent.

In some implementations, the system can extract features from the predicted paths of a given surrounding agent, and provide the extracted features to the cut-in machine learning model. As a particular example, the system can extract features characterizing whether or not the given surrounding agent is likely to collide with one or more other surrounding agents. The system can further extract the nearest collision time that the given surrounding agent might collide with the vehicle or another surrounding agent. As another particular example, the system can extract traffic light information characterizing one or more traffic lights that are in a predicted path of the given surrounding agent. In particular, the system can extract features that characterize how far the traffic light is from the given surrounding agent, and whether a crosswalk is at the traffic light. As another particular example, the system can extract stop sign information characterizing one or more stop signs that are in a predicted path of the given surrounding agent. In particular, the system can extract features that characterize how far the stop sign is from the given surrounding agent, and whether a crosswalk is at the stop sign. As another particular example, the system can extract a feature characterizing the maximum lateral acceleration of the given surrounding agent.

Figure 9:
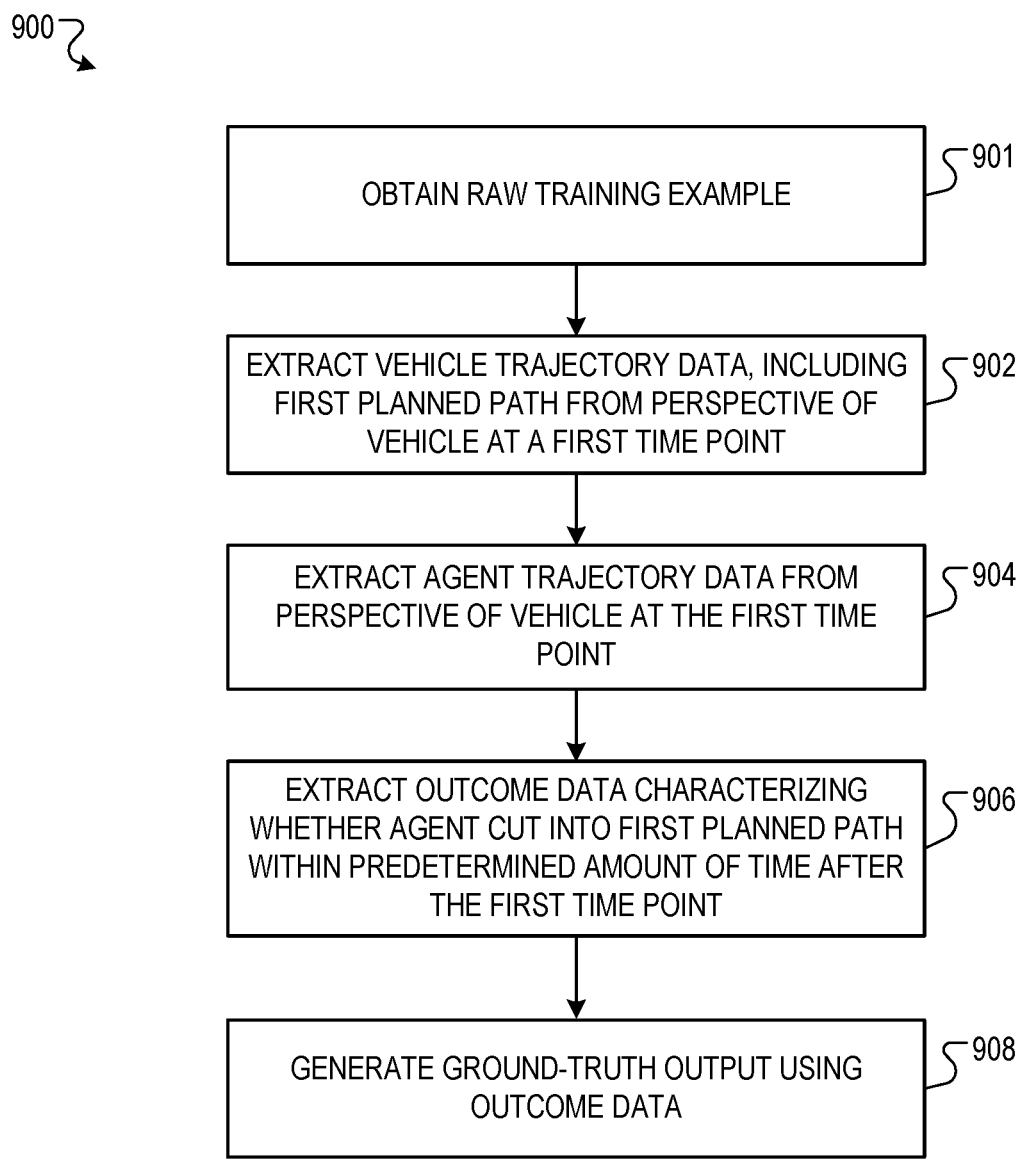
FIG. 9 is a flow diagram of an example process for generating a training example for training a cut-in neural network.

FIG. 9 is a flow diagram of an example process 900 for generating a training example for training a cut-in neural network. For convenience, the process 900 will be described as being performed by a system of one or more computers located in one or more locations. For example, a training system, e.g., the training system 120 of FIG. 1, appropriately programmed in accordance with this specification, can perform the process 900.

The system obtains a raw training example (step 901). The system can obtain the raw training example from a vehicle navigating through the real world. As described above with reference to FIG. 1, the raw training example includes three components: i) vehicle trajectory data, ii) agent trajectory data, and iii) outcome data.

The system extracts the vehicle trajectory data (step 902). The vehicle trajectory data is from the point of view of the vehicle at a first time, and characterizes a current state at the first time point and one or more previous states at respective previous time points before the first time point. As before, the state of an agent at a given time point can include the location of the agent at the given time point, as well as values for a predetermined set of motion parameters. The vehicle trajectory data also includes a first planned path from the perspective of the vehicle at the first time point. That is, the first planned path characterizes the path that the vehicle had intended to take at the first time point. In some implementations, the vehicle trajectory data includes the time and motion channels described in reference to FIG. 2A. In some other implementations, the system generates the time and motion channels using the data in the raw training example. The vehicle trajectory data is part of the input for the training example.

The system extracts the agent trajectory data (step 904). The agent trajectory data is also from the point of view of the vehicle at a first time point, and characterizes, for each surrounding agent of the vehicle, a current state at the first time point and one or more previous states at respective previous time points before the first time point. The agent trajectory data also includes predicted paths of the respective surrounding agents from the perspective of the vehicle at the first time point. That is, the predicted paths of a respective agent characterizes the paths that the vehicle at the first time point believed the agent would take. In some implementations, the agent trajectory data includes the time and motion channels described in reference to FIG. 2B. In some other implementations, the system generates the time and motion channels using the data in the raw training example. The agent trajectory data is part of the input for the training example.

The system extracts the outcome data (step 906). The outcome data characterizes whether one or more respective surrounding agents actually cut into the first planned path within a predetermined amount of time after the first time point. For example, if the first time point is time t and the predetermined amount of time is 3 time steps, then the outcome data characterizes whether a respective agent cut into the first planned path between time t and time t+3.

Importantly, the outcome data does not characterize whether the respective agent actually collided with the vehicle, or whether the respective agent cut into a second planned path, the second planned path being from the perspective of the vehicle at time t+1 or t+2. This is because the vehicle might have changed its planned path between time t and time t+3, perhaps to avoid a collision with the agent. This does not change the fact that the agent would have cut into the first planned path of the vehicle if the vehicle had not changed course. The system operates exclusively from the perspective of the first time t, determining whether a surrounding agent will cut into the first planned path of time t between time t and time t+3.

In particular, the outcome data can characterize that a respective surrounding agent did cut into the first planned path of the vehicle if the surrounding agent partially, but not fully, overlapped with the planned path of the vehicle, e.g., if part of the surrounding agent, e.g., the front bumper of the agent, entered the lane of the vehicle but the entire surrounding agent did not enter the lane. The outcome data can characterize that a respective surrounding agent did not cut into the first planned path of the vehicle if the surrounding agent entered a given portion of the planned path of the vehicle after the vehicle had passed the given portion of the planned path, e.g., if the surrounding agent at time t+2 entered a portion of the planned path that the vehicle occupied at time t+1.

The system generates a ground-truth output using the output data (step 908). In some implementations, the ground-truth output is a two-dimensional array of data values, where each position in the array corresponds to a respective location in the environment and the value at each position corresponds to a cut-in label of the respective location. The cut-in label for a given position in the ground-truth output can be a value in a certain range, e.g., [0,1] or [80,250]. In particular, for the positions corresponding to locations of agents that did cut into the first planned path of the vehicle, the system can set the maximum value for the cut-in label, e.g., 1 for the range [0,1] or 250 for the range [80,250]. In some implementations, for the positions corresponding to locations of agents that did not cut into the first planned path of the vehicle, the system sets some small non-zero value, e.g., 0.05 or 0.01 for the range [0,1] or 80 for the range [80,250]. This is done so that the ground-truth output encodes the fact that there is an agent in the corresponding location, and the fact that the agent did not cut in front of the vehicle. This helps the cut-in neural network learn the format that the cut-in output should take, i.e., non-zero values for positions corresponding to locations of agents, and provides a richer error signal for updating the parameters of the network. In some other implementations, for the positions corresponding to locations of agents that did not cut into the first planned path of the vehicle, the system sets the minimum value, e.g., 80 for the range [80,250]. For the positions corresponding to locations not occupied by a surrounding agent, the system sets a default value, e.g., 0.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   obtaining agent trajectory data comprising, for each particular agent of one or more agents in an environment:
      for a current time point, a current location of the particular agent and current values for a predetermined set of motion parameters of the particular agent; and
      for each of one or more previous time points, a respective previous location of the particular agent and respective previous values for the predetermined set of motion parameters of the particular agent;
   obtaining vehicle trajectory data of a vehicle in the environment, the vehicle trajectory data comprising:
      for the current time point, a current location of the vehicle and current values for the predetermined set of motion parameters of the vehicle;
      for each of the one or more previous time points, a respective previous location of the vehicle and respective previous values for the predetermined set of motion parameters of the vehicle; and
      for each of one or more future time points, a respective planned future location of the vehicle and respective planned future values for the predetermined set of motion parameters of the vehicle; and
   processing a network input generated from the agent trajectory data and vehicle trajectory data using a neural network to generate a single cut-in output, wherein the single cut-in output comprises a respective cut-in probability for each of a plurality of locations in the environment, the plurality of locations comprising one or more agent locations that are each a current location of a different one of the one or more agents and non-agent locations that are not any of the current locations of the one or more agents,
      wherein, for each particular agent location, the respective cut-in probability characterizes a predicted likelihood that the particular agent in the particular agent location at the current time point will intersect with at least one respective planned future location of the vehicle within a predetermined amount of time.

2. The method of claim 1, wherein, for each of the one or more agents, the agent trajectory data further comprises, for each of the one or more future time points, a respective predicted future location of the particular agent and respective predicted future values for the predetermined set of motion parameters of the particular agent.

3. The method of claim 1, wherein the neural network has been trained to generate null probabilities for the non-agent locations.

4. The method of claim 1, wherein the network input comprises at least one of:
   an image characterizing road lanes in the environment; or
   an image characterizing bounding boxes of the one or more agents in the environment.

5. The method of claim 1, wherein:
   the network input comprises, for each particular agent of the one or more agents and for the vehicle, a respective concatenation of a respective plurality of channels, and wherein, for each concatenation corresponding to the particular agent or the vehicle:
      each channel, of the plurality of channels of the concatenation, is represented as a two-dimensional array of data values;
      each channel of the plurality of channels of the concatenation comprises a plurality of positions, where each position has a respective index and corresponds to a respective location of a second plurality of locations in the environment;
      positions in different channels of the particular agent, of the plurality of channels of the concatenation, that have a same index correspond to a same location of the second plurality of locations in the environment;
      the plurality of channels of the concatenation comprises a time channel and a respective motion channel corresponding to each motion parameter in the predetermined set of motion parameters; and
      for each particular location of the second plurality of locations in the environment occupied at a respective particular time point by the particular agent or vehicle corresponding to the concatenation:
         the position in the time channel that corresponds to the particular location identifies the particular time point; and
         for each motion channel, the position in the motion channel that corresponds to the particular location identifies the value of the motion parameter corresponding to the motion channel at the particular time point for the particular agent or vehicle.

6. The method of claim 1, wherein the predetermined set of motion parameters comprises at least one of:
a heading of the particular agent or vehicle at the time point,
a velocity of the particular agent or vehicle at the time point, or
an acceleration of the particular agent or vehicle at the time point.

7. The method of claim 1, wherein the cut-in output comprises a two-dimensional array of data values, wherein each position in the array corresponds to a respective location of the plurality of locations in the environment, and wherein the data value at each position characterizes the cut-in probability of the corresponding location.

8. The method of claim 1, further comprising:
generating cut-in neural network features, comprising one or more of:
extracting features from the cut-in output, or
extracting features from one or more intermediate outputs of the neural network; and
generating agent cut-in probabilities for the one or more agents in the environment using the cut-in neural network features, wherein the agent cut-in probability for each agent represents a probability that the agent will intersect with at least one of the planned future locations of the vehicle in the predetermined amount of time.

9. The method of claim 8, wherein the features extracted from the cut-in output include one or more of:
an average cut-in probability of a first plurality of locations in a first predetermined region of the environment, or
a maximum cut-in probability of a second plurality of locations in a second predetermined region of the environment.

10. The method of claim 8, wherein generating the agent cut-in probabilities using the cut-in neural network features comprises providing a model input generated from the cut-in neural network features to a different cut-in machine learning model that operates on (i) the cut-in neural network features and (ii) other features of the one or more agents, other features of the vehicle, or both.

11. The method of claim 10, wherein the different cut-in machine learning model is a random decision forest.

12. The method of claim 10, further comprising:
calculating a respective initial agent cut-in probability for each of the one or more agents, comprising:
receiving data specifying one or more predicted paths for the agent, each predicted path comprising one or more predicted future locations;
receiving data specifying a respective predicted path probability for each of the one or more predicted paths of the agent, wherein the predicted path probability for a given predicted path characterizes a likelihood that the agent will travel on the predicted path;
determining which if any of the predicted paths intersect with at least one of the planned future locations of the vehicle in the predetermined amount of time; and
generating the respective initial agent cut-in probability by combining the respective predicted path probabilities of any predicted paths that intersect with at least one of the planned future locations of the vehicle; and providing the initial agent cut-in probabilities as a second model input to the different cut-in machine learning model.

13. The method of claim 12, further comprising:
for each of the one or more agents and for at least one of the one or more predicted paths for the agent, extracting one or more features characterizing the predicted, wherein the one or more features comprise one or more of:
a nearest collision time with the vehicle,
a nearest collision time with one or more other agents,
one or more features related to a traffic light,
one or more features related to a stop sign, or
a maximum lateral acceleration of the agent; and
providing the features characterizing the predicted paths of the agents as a third model input to the different cut-in machine learning model.

14. The method of claim 10, further comprising:
determining one or more features characterizing the particular agent, wherein the one or more features comprise one or more of: a velocity of the particular agent, an acceleration of the particular agent, or a heading of the particular agent; and
providing the one or more features characterizing the particular agent as a fourth model input to the different cut-in machine learning model.

15. A system comprising one or more computers and one or more storage devices storing instructions that are operable, when executed by the one or more computers, to cause the one or more computers to perform operations comprising:
obtaining agent trajectory data comprising, for each particular agent of one or more agents in an environment:
for a current time point, a current location of the particular agent and current values for a predetermined set of motion parameters of the particular agent; and
for each of one or more previous time points, a respective previous location of the particular agent and respective previous values for the predetermined set of motion parameters of the particular agent;
obtaining vehicle trajectory data of a vehicle in the environment, the vehicle trajectory data comprising:
for the current time point, a current location of the vehicle and current values for the predetermined set of motion parameters of the vehicle;
for each of the one or more previous time points, a respective previous location of the vehicle and respective previous values for the predetermined set of motion parameters of the vehicle; and
for each of one or more future time points, a respective planned future location of the vehicle and respective planned future values for the predetermined set of motion parameters of the vehicle; and
processing a network input generated from the agent trajectory data and vehicle trajectory data using a neural network to generate a single cut-in output, wherein the single cut-in output comprises a respective cut-in probability for each of a plurality of locations in the environment, the plurality of locations comprising one or more agent locations that are each a current location of a different one of the one or more agents and non-agent locations that are not any of the current locations of the one or more agents,
wherein, for each particular agent location, the respective cut-in probability characterizes a predicted likelihood that the particular agent in the particular agent location at the current time point will intersect with at least one respective planned future location of the vehicle within a predetermined amount of time.

16. The system of claim 15, wherein:
the network input comprises, for each particular agent of the one or more agents and for the vehicle, a respective concatenation of a respective plurality of channels, and wherein, for each concatenation corresponding to the particular agent or the vehicle:
  each channel, of the plurality of channels of the concatenation, is represented as a two-dimensional array of data values;
  each channel of the plurality of channels of the concatenation comprises a plurality of positions, where each position has a respective index and corresponds to a respective location of a second plurality of locations in the environment;
  positions in different channels of the particular agent, of the plurality of channels of the concatenation, that have a same index correspond to a same location of the second plurality of locations in the environment;
  the plurality of channels of the concatenation comprises a time channel and a respective motion channel corresponding to each motion parameter in the predetermined set of motion parameters; and
  for each particular location of the second plurality of locations in the environment occupied at a respective particular time point by the particular agent or vehicle corresponding to the concatenation:
    the position in the time channel that corresponds to the particular location identifies the particular time point; and
    for each motion channel, the position in the motion channel that corresponds to the particular location identifies the value of the motion parameter corresponding to the motion channel at the particular time point for the particular agent or vehicle.

17. The system of claim 15, wherein the cut-in output comprises a two-dimensional array of data values, wherein each position in the array corresponds to a respective location of the plurality of locations in the environment, and wherein the data value at each position characterizes the cut-in probability of the corresponding location.

18. One or more non-transitory computer-readable storage media storing instructions that when executed by one or more computers cause the one or more computers to perform operations comprising:
  obtaining agent trajectory data comprising, for each particular agent of one or more agents in an environment:
    for a current time point, a current location of the particular agent and current values for a predetermined set of motion parameters of the particular agent; and
    for each of one or more previous time points, a respective previous location of the particular agent and respective previous values for the predetermined set of motion parameters of the particular agent;
  obtaining vehicle trajectory data of a vehicle in the environment, the vehicle trajectory data comprising:
    for the current time point, a current location of the vehicle and current values for the predetermined set of motion parameters of the vehicle;
    for each of the one or more previous time points, a respective previous location of the vehicle and respective previous values for the predetermined set of motion parameters of the vehicle; and
    for each of one or more future time points, a respective planned future location of the vehicle and respective planned future values for the predetermined set of motion parameters of the vehicle; and
  processing a network input generated from the agent trajectory data and vehicle trajectory data using a neural network to generate a single cut-in output, wherein the single cut-in output comprises a respective cut-in probability for each of a plurality of locations in the environment, the plurality of locations comprising one or more agent locations that are each a current location of a different one of the one or more agents and non-agent locations that are not any of the current locations of the one or more agents,
  wherein, for each particular agent location, the respective cut-in probability characterizes a predicted likelihood that the particular agent in the particular agent location at the current time point will intersect with at least one respective planned future location of the vehicle within a predetermined amount of time.

19. The method of claim 5, wherein the plurality of locations and the second plurality of locations are the same.

* * * * *